United States Patent Office 3,729,338
Patented Apr. 24, 1973

3,729,338
PROCESS FOR THE PREPARATION OF SELF-ADHESIVE TAPES AND FOILS
Horst Lehmann and Julius Curts, Hamburg, Germany, assignors to Biersdorf Aktiengesellschaft, Hamburg, Germany
No Drawing. Continuation of abandoned application Ser. No. 771,649, Aug. 29, 1968. This application Mar. 24, 1971, Ser. No. 127,849
Claims priority, application Germany, Oct. 31, 1967, P 17 19 096.4
Int. Cl. C09j 7/02
U.S. Cl. 117—122 P          5 Claims

ABSTRACT OF THE DISCLOSURE

Shelf-adhesive tapes or foils which adhere to a variety of dissimilar surfaces upon mere contact without the need of more than slight pressure and have good resistance to heat are prepared by applying on a flexible support, after addition of a small amount of a catalyst and/or a polyfunctional compound, a low molecular copolymer which is spreadable at room temperature in a condition such that it has only small quantities of solvents therein, composed of acrylic acid alkyl esters and a relatively small amount of monomeric compounds which are polymerizable with them, and contain reactive groups in the molecule, and subsequently exposing the coating composition applied to the support to the action of heat for a short time. The action of heat causes the cross-linking of the coating composition and converts it from the liquid or thickly liquid state into a solid cohesive self-adhesive layer with the properties of a good self-adhesive mass.

---

This application is a continuation of application Ser. No. 771,649, filed Aug. 29, 1968, now abandoned.

The invention relates to a method of producing pressure-sensitive adhesive tapes or sheets in which a low molecular spreadable acrylate copolymer in solvent-free or approximately solvent-free state, after addition of a small amount of a catalyst and/or of a polyfunctional compound, is applied to a flexible support and then subjected thereon to a curing (crosslinking) by the action of heat for a short time at relatively low temperatures, whereby there is formed an adhesive layer having the properties of a good pressure-sensitive adhesive composition.

Pressure sensitive adhesives having a base of polyacrylates or acrylate copolymers which are more resistant to the action of oxygen and light than adhesives having a base or rubber and furthermore give clear, colorless adhesive layers, are being used to an increasing extent for the production of pressure-sensitive adhesive articles of the most varied type. On the other hand, however, they exhibit thermoplasticity, cold flow and furthermore, due to their easy solubility in organic solvents, a high degree of sensitivity to such solvents which impair their suitability for certain purposes of use.

In order to produce pressure-sensitive adhesive tapes which are resistant to solvent, heat and the weather, it has therefore already been proposed to produce copolymers from acrylates with monomers which contain reactive groups in the molecule and then, after application to a flexible sheet-like or fibrous support, to convert them on the support either merely by the action of heat with or without addition of a catalyst (self-curing polymers) or with additional polyfunctional compounds.

These known polyacrylates or acrylates copolymers having pressure-sensitive properties are relatively high molecular highly viscous polymers which are substantially solid at normal temperature and which, in order to produce pressure-sensitive adhesive tapes or sheets, are spread in the form of solutions in an organic solvent or in the form of aqueous dispersions onto the support material on which thereupon the pressure-sensitive layer is formed upon evaporation of the water or of the solvent by means of suitable drying devices and possibly further action of heat.

The use of solutions for the coating of supports requires the use, in order to recover the solvents, of expensive machines, the setting up of which also takes a large amount of space, as well as the installation of exhaust ducts of high capacity. Despite considerable expenditures for the systems for the recovery of the solvents intended for this purpose, considerable losses of solvent are frequently unavoidable. The speed of production of the pressure-sensitive adhesive tapes or sheets produced in this way is substantially determined by the comparatively slow rate of drying of the pressure-sensitive tapes or sheets. In addition to this, there is the further disadvantage of this type of coating that the solvents which generally enter into consideration for this purpose burn readily and that their vapors form with atmospheric oxygen explosive mixtures which make it necessary to use explosion-protected machines and workrooms, in which connection these rooms, as a rule, must be strongly moistened in order to avoid the formation of sparks by electrostatic charging. Since the solvents generally constitute at least 50% of the spreadable coating composition, they furthermore increase the cost of the manufacture and transportation of the compositions.

In contradistinction to this, the use of aqueous dispersions instead of solutions for the application of the adhesive polymers or copolymers—aside from the fact that it makes particularly long times of drying necessary in the case of support materials which are impermeable to water and water vapor—in its turn has the disadvantage that the water-soluble non-volatile surface-active substances (emulsifiers) or stabilzers which are customarily used to prepare the dispersions, frequently have an unfavorable effect on the resistance to water of the adhesive layer formed on the support upon the drying.

It is furthermore known to produce pressure-sensitive adhesive tapes by applying the solvent-free plasticized adhesive compositions having a base of natural or synthetic rubber which can be converted at higher temperatures into a spreadable, low-viscosity condition to a support by means of heated rollers (calenders) or a heated extruder.

It is also known to produce melts from suitable plastics, such as, for instance, a mixture of polyvinyl ethers of different degree of polymerization and then to apply them in hot, low-viscous state to a support by means of ordinary coating devices.

The disadvantage of these pressure-sensitive adhesive compositions which can be applied without solvent is that they are sensitive to heat so that their use becomes limited and they do not have such a low viscosity that they can be worked even at room temperature.

In order to eliminate these disadvantages, it has already been proposed, with respect to pressure-sensitive adhesive compositions having a base of acrylate copolymers, to produce pressure-sensitive adhesive tapes or sheets by applying the liquid copolymerizable monomer mixture or a corresponding prepolymer to a support and effecting the polymerization or completion of the polymerization leading to the formation of a pressure-sensitive adhesive layer on the support itself by irradiation with ultraviolet light (Netherlands patent application 6601711). In this connection, it has already been proposed to apply a vinyl ester/acrylate copolymer of low average molecular weight in the form of a hot melt to a support and effecting the further polymerization or curing to form a self-adhering composition in the presence of an oxygen acceptor on the support by ultraviolet radiation of a wavelength of between 2000 and 3000 A. (German Provisional Patent 1,192,769, particularly Example III).

The methods of producing pressure-sensitive adhesive tapes or sheets with the use of electromagnetic irradiation in a given wavelength range require extensive and complicated apparatus which results, inter alia, in a comparatively low rate of production, and also the use preferably of foreign substances (oxygen acceptors) for the transfer of the energy of radiation.

The object of the present invention is to provide a method of producing pressure-sensitive adhesive tapes or sheets having a base of acrylate copolymers which makes it possible to apply such copolymers even at room temperature in solvent-free state, i.e., without the use of organic solvents or of water, by means of ordinary coating machines on a support and to convert the low-viscous layer of copolymer obtained on the support, to which a small quantity of catalyst and/or a polyfunctional compound has been added before the application, into a pressure-sensitive adhesive layer which has good resistance to heat and adheres firmly to the support by the action for a short period of time of heat (curing).

Another object of the invention consists in developing and using copolymers which, after the addition of a small amount of a catalyst and/or of a polyfunctional compound, can be cured or hardened on the support even at low temperatures, and preferably within the temperature range of 80 to 100° C., with only a very short time of action, particularly a period of 5 to 15 minutes, to form a pressure-sensitive adhesive composition having good self-adhering properties.

It has now been found that pressure-sensitive adhesive tapes or sheets having a pressure-sensitive adhesive layer of a base of acrylate copolymers are obtained in particularly advantageous manner by applying a low-molecular, spreadable copolymer of:

(a) about 85 to 99.95 parts by weight of one or more acrylic acid alkyl ester whose primary or secondary alcohol component contains 4 to 12 carbon atoms in branched or unbranched chain, the acrylic acid alkyl ester being possibly replaced up to about one-half of the quantity selected by other unsaturated monomers, such as vinyl esters, vinyl ethers, lower acrylic acid esters, methacrylic acid alkyl esters, acrylonitrile, methacrylonitrile, methylene glutaronitrile or their mixtures, and (b) about 0.05 to 15 parts by weight of one or more monomers which are polymerizable therewith and which, in addition to polymerizable double bonds, contain one or more reactive groups in the molecule, to which a small amount of a catalyst and/or of a polyfunctional compound has been added, in solvent-free or approximately solvent-free state to a flexible support and converting it then on said support by brief action of heat (curing) into a pressure-sensitive adhesive layer of good adhesive power and resistance to heat.

By the expression "lower acrylic acid ester" there are meant in particular those having 1 to 3 carbon atoms in the alkyl alcohol radical; among the vinyl esters which may partially replace the acrylic component, vinyl acetate is preferred.

For the copolymerization with the monomers of component (a) there are suitable as comonomers with reactive groups (component (b)) within the quantity range indicated monomers which have one or more reactive groups, such as, for instance, epoxy, carboxyl, hydroxyl and isocyanate groups for instance glycidyl acrylate, glycidyl methacrylate, allyl glycidyl ether, acrolein, diketene, maleic anhydride, acrylic acid, methacrylic acid, methylene glutaric acid, acryloyl malonic acid diethyl ester, acrylic acid-2-isocyanate ester or its urethanes, acrylic acid amide, methacrylic acid amide, methylacrylic acid amide, N,N-dimethyl acrylic acid amide, methylol acrylamide, methylol methacrylic acid amide, as well as their ethers or Schiff bases, hydroxy ethyl methacrylate, hydroxy propyl methacrylate, butenol-3, allyl alcohol or their mixtures. In addition to this, aside from the monomers mentioned, there can also be used for the same purpose in the quantity range indicated other monomers having reactive groups.

The exact quantity of the monomer or monomers with reactive groups in the molecule (component (b)) which can be used for copolymerization with the monomers of component (a) depends on the nature and reactivity of the monomer or monomers, which in its turn depends on the number of reactive groups in the molecule. It must be established individually in each case on basis of the monomers selected. This can easily be done by a person skilled in the art based on his expert knowledge by simple trial and error. In this connection, it must be borne in mind that the selection of the monomers which are to be copolymerized is so selected that when thoroughly polymerized under normal conditions, there are obtained copolymers which have at most the coherence of an ordinary pressure-sensitive self-adhesive composition but must in no event be lacquer-like.

The copolymers are produced in customary manner with the use of initiators (polymerization catalysts) which cause only the double bonds of the monomer molecules to react, for instance radical formers, such as benzoyl peroxide, di-tert. butyl peroxide or $\alpha,\alpha'$-azodiisobutyronitrile or of redox catalysts or catalyst systems catalyzed with heavy metal, in which connection the polymerization can preferably be carried out in bulk, i.e., in the absence of any solvent or diluent. In this connection, the polymerizations are so established, for instance by use of regulators, such as lauryl mercaptan or dithio-bis-(thioformic acid)-o,o-diisopropyl ester (diproxide), by high initiator concentration and by variation of the time and temperature of polymerization, and the monomers to be copolymerized are so selected that copolymers of small size molecule (low K value from about 24 to about 37) and low viscosity are obtained which are of such consistency that they can be applied directly, i.e., without the use of a solvent or diluent, to flexible supports of the most varied type with the use of ordinary coating apparatus. The copolymers produced in this manner should be as free as possible of monomers, since larger quantities of monomer in the copolymer act like solvents.

Before they are used for the coating of supports, the addition substances necessary for the further reaction (crosslinking) must be admixed in the copolymers. These addition substances may consist of a catalyst and/or of one or more polyfunctional compounds.

As catalysts there may be employed acids, such as octyl phosphoric acid or p-toluene sulfonic acid, or metal compounds, such as zinc chloride or dibutyl tin dilaurate, in quantities of at most 2%, and preferably 1% and less, depending on the nature of the catalyst selected, referred to the copolymer. The catalyst can possibly be added in the form of a solution in water or of a volatile low alcohol to the copolymer.

As polyfunctional compounds which are capable of reacting with reactive groups of the copolymer, for instance with epoxy, carboxyl, hydroxyl or isocyanate groups, there are suitable for the method of the invention in particular polyisocyanates and their reaction products, polyalkylene polyamines, such as hexamethylene diamine, alkanolamines, such as triethanolamine, and epoxy compounds. The quantity which should be used in the specific case will depend on the nature of the polyfunctional compound selected; however, in general, it should not exceed 15% (referred to the copolymer).

Examples of polyisocyanates and their reaction products which can be used for the method for the invention are: toluylene - 2,4 - diisocyanate, toluylene-2,6-diisocyanate, cyclohexylene-1,4-diisocyanate, diphenyl methane-4,4'-diisocyanate, naphthylene-1,5-diisocyanate, 4,4',4"-triphenyl methane triisocyanate, isocyanate-group-containing reaction products of polyhydric alcohols with polyisocyanates, for instance the reaction product of 1 mol of trimethylol propane with 3 mols of toluylene diisocyanate, trimerized and polymerized isocyanates and so-called isocyanate splitters (latent isocyanates), which liberate isocyanate groups only at higher temperature, such as, for instance, reaction products of polyisocyanates with phenols.

In order to accelerate the reaction of polyisocyanates with hydroxyl groups of the copolymer, tertiary amines or organometallic compounds, such as dibutyl tin dilaurate, can be used as catalysts.

The polyisocyanates or their reaction products can also be added to the copolymer in the form of a solution in an organic solvent. Suitable solvents are, for instance, ethyl acetate, butyl acetate, ether esters, such as ethyl glycol diacetate, and aromatics, such as benzene, toluene or xylene.

Upon the adding of the addition substance (catalysts, polyfunctional compounds) to the copolymer, a slow reaction will at times take place even at room temperature. In order to avoid the gelation of the mixture which then occurs and which has the result that the mixture is no longer suitable for the coating of supports, it is advisable to add the addition substances to the copolymer only just before the coating is effected. This is preferably done by providing a small mixing chamber directly in front of the coating apparatus, into which chamber copolymers and addition substances—the latter possibly dissolved in a small amount of a non-burnable solvent—are pumped in exactly measured quantity and then intimately mixed with each other therein.

The coating composition can furthermore contain small quantities of resins for increasing tack, fillers, dyestuffs or pigments in order to obtain special effects.

The coating of the flexible sheet or fibrous supports can be effected by ordinary coating machines, for instance knife, beam or roll coaters.

As flexible supports there can be used for the method of the invention sheets of plastics or modified natural substances, paper, all types of fabrics, nonwoven fabrics, as well as metal foils, metallized plastic foils, and asbestos fiber and fiber glass fabrics.

Directly behind the device for forming the layers, the flexible support provided with a layer is converted into a solid cohesive, self-adhesive layer of good stability to heat and good stability to solvents, by heating it about 2 to 20 minutes, to 60–150° C., and preferably 3 to 15 minutes, to a temperature of 80 to 100° C. Thereby, the duration of heating may be the shorter, the higher the temperature is selected.

It is assumed that due to this short action of heat, the reactive groups of the copolymers, or double bonds which are still present in the copolymers, are activated to such an extent that these reactive groups are capable of reacting with each other or with the reactive groups of the added polyfunctional compound, whereby the copolymers is cross-linked.

In this manner excellent self-adhesive tapes and foils are obtained which are distinguished by good adhesive power and a good "quick-stick" capacity and good stability to heat.

The self-adhesive tapes or foils can be cut to the desired width subsequently after cooling and then wound up to rolls for commerce. In order to facilitate rolling off, the back side of the foils, films or tapes can be provided with adhesive-repellent coating. Or the adhesive layer of the support can be covered with paper which is provided with an adhesive-repellent layer e.g. a separating layer consisting of silicone.

According to a further embodiment of the invention, the copolymers applied can be subjected to a preliminary cross-linking only. In this condition the support coated can be rolled up to rolls, bundles or the like with the use of cover foils or paper—which serve as intermediate layers—and can be converted by a short period of heating, at relatively low temperatures, or by storing at room temperature for several days, into the completely cross-linked condition. This procedure can be used particularly in cases, in which it is desired to carry out the process of the invention in view of the heat sensitivity of certain supporting materials, under particularly mild conditions, within a very short period of time.

Another possibility of carrying out the process of the invention consists in that the copolymers is supplied to the surface of a heated cylinder or the like or to an endless steel tape and subjected on these supports to a preliminary cross-linking only and is subsequently transferred in condition of said cross-linking to sensitive supporting materials, such as for example fleece materials. The complete cross-linking of the copolymers in connection with the final support then takes place by a short action of heat. In order to facilitate the complete transfer of the copolymers—which are in the condition of priliminary cross-linking—from the surface of the cylinder or the endless steel tape to the supporting material, the surface of the cylinder or that surface of the steel tape which comes in contact with the copolymers, is preferably provided with an adhesive-repellent coating, for example a silicone compound having an antiadhesive effect or polytetrafluorethylene.

The invention is further illustrated by the following examples, to which the invention is not limited.

EXAMPLE 1

A mixture was prepared from 190 g. of acrylic acid-n-butylester, 6 g. of methacrylic acid-glycidylester (glycidylmethacrylate) and 4 g. of acrylic acid with the addition of 2.4 g. of 1-dodecanethiol (laurylmercaptan) and 2 g. of benzoylperoxide. 50 g. of this mixture are introduced into a three-necked flask which is provided with a stirrer, a reflux condenser, a dropping funnel and also with a feed pipe for nitrogen. The mixture was saturated with nitrogen under stirring. 15 minutes after the start of introducing nitrogen, the content of the flask was heated on a water bath to 60° C. and the residual mixture was added drop by drop within 2 hours slowly from the dropping funnel (about 1 drop per second). After terminating said dropping in, 2 g. of benzoylperoxide were added and polymerization continued for 6 hours at 58° C. Thereby cooling or heating may become necessary in order to keep the reaction temperature constant at 58° C. After the end of this period, polymerization is terminated by cooling to room temperature. Examination of the copolymers formed gave the following results:

Solid content (dried at 120° C. for 2 hours)
    percent__ 93.4
K-value (according to Fikentscher "Cellulose-Chemie" 13 (1932), page 58) _____ 37
Viscosity (measured in the rotation viscosimeter of the firm Haake, Berlin) _____cp__ 67000

This copolymers was mixed with 10 ml. of a 10% zinc chloride solution in isopropanol and with 6 ml. of a solution of 37.5% of the reaction product from 1 mol of trimethylolpropane with 3 mols of toluylenediisocyanate in acetic acid ethylester. The resulting product was applied—with the use of a conventional feeding device—in an amount of 40 g./m.² to a foil consisting of terephthalic acid-ethylene-glycol-polyester which has been provided previously with a thin primary layer which serves as an anchoring layer for the adhesive mass. Subsequently, the foil coated with the adhesive layer was heated for 10 minutes to 100° C. whereby the first thickly liquid of copolymers on the foil, was converted into a solid self-adhesive layer of sufficient cohesion to prevent splitting and formation of ropy structure upon removal of the removal of the self-adhesive foil thus obtained from surfaces (for example metal, lacquer, glass, human skin) to which they are applied.

The finished adhesive foil was subsequently cut to strips and wound up to rolls.

The adhesive strips thus obtained, which adhere on pressure, exhibit a good adhesive power of about 400 p./cm. on steel (angle of drawing off: 180°, viscosity of drawing off: 300 mm./minute) and a good heat resistance.

In order to test the holding power at elevated temperature a steel plate of 4.8 x 10 cm. x 1.6 mm. was polished in longitudinal direction with abrasive paper and cleaned with hot gasoline. An adhesive strip of 15 cm. length and 2 cm. width was pasted on the steel plate in such manner that from the edge on the narrow side a length of 2.54 cm. (=1 inch) lied on the steel plate. The pasted part of the adhesive strip was pressed by moving a roll of 2 kg. weight to and fro. The free end of the strip was now weighted by a weight of 800 g. at vertical suspension. The examination was carried out by varying temperatures (50 and 100° C.) and the time up to falling off of the strip (+weight) was measured. The "holding power" determined in this manner amounted at 50° C. to about 80 minutes and at 100° C. over 90 minutes; this shows that at 100° C. an additional cross-linking took place. Comparative tests with unvulcanized rubber and not cross-linked polyacrylic acid ester-self-adhesive masses have shown under equal weighting at 100° C. values of about 3 to 10 minutes and at 50° C. values between 10 and 40 minutes.

EXAMPLE 2

95 g. n-butylacrylate
95 g. isooctylacrylate (2-ethyl-hexylacrylate)
6 g. glycidylmethacrylate
4 g. acrylic acid
2 g. benzoylperoxide (initiator)
2 g. 1-dodecanethiol (regulator)
20 g. chloroform were mixed and polymerized in the manner described in Example 1.

Solid substance content: (theoretically 89.3%)
Viscosity: (rotation viscosimeter: About 250000 cp.

100 g. of the resulting copolymers were intimately mixed with 10 ml. of a 10% zinc chloride solution in isopropanol and 3 ml. of a mixture from equal parts of the commercial product "Desmodur L," Bayer and chloroform in a mixing chamber. "Desmodur L," Bayer is a solution of 75% by weight of the reaction product of 1 mol trimethylolpropane and 3 mols of toluylenediisocyanate in acetic acid ethyl ester. Said brushable mixture was fed in conventional manner in a layer of 30 g./m.$^2$ thickness to a foil of terephthalic acid-ethyleneglycol-polyester (polyethyleneterephthalate), which previously has been provided with a thin layer of a conventional intermediary for improving adherence. Subsequently the coated foil is heated in a drying tunnel for 5 minutes to a temperature of 100° C. Due to the cross-linking occurring in this step from the initial copolymers of low viscosity a self-adhesive layer of good cohesion and good adhesion to most varied surfaces (such as metal, lacquer, wood, and human skin) was formed.

Measurements carried out with self-adhesive foils prepared in this manner gave the following results:

Adhesive power on steel (drawing off velocity 300 mm./minutes): About 300 p./cm.
"Holding power" at 50° C. and 100° C. (800 g. weighting): Over 90 minutes
"Quick-stick": 40–60 cm.

The term "quick-stick" denotes the immediate adhesive power of a pressure sensitive adhesive tape in the moment of contact between self-adhesive mass and the surface to which said mass is applied. In order to determine the value of "quick-stick" an adhesive strip of 150 cm. length and about 2 cm. width was fastened to a rail or bar bent at a predetermined radius downward (concave). Over the surface to be pasted of the strip a steel ball having a weight of 63.6 g. was allowed to roll downward. The difference in height between the starting point of the ball and the end point of the adhesive strip of 150 cm. length amounted to 250 mm. The distance between the starting point and the halting point of the ball, measured in centimeters, gave the value of "quick-stick." The smaller the value, i.e. the more the ball is subjected to braking due to the adhesiveness of the adhesive surface of the strip, the better the "quick-stick" will be. In the test, the adhesive surface of the strip is upward.

EXAMPLE 3

50 g. of a mixture consisting of
146 g. of isooctylacrylate (2-ethyl-hexylacrylate)
40 g. of vinylacetate
6 g. of glycidylmethacrylate
4 g. of acrylic acid
4 g. of acrolein
1 g. of diproxid=dithio-bis-(thioformic acid)-o,o-diisopropylester
2 g. of benzoylperoxide were introduced into a three-necked flask (see Example 1). The mixture present in form of a solution is saturated with nitrogen. 15 minutes after the start of introducing nitrogen the contents of the flask is heated by means of a water bath to 70° C. and the remaining solution of 153 g. is added drop by drop from a dropping funnel (about 1 drop per second). After terminating the dropwise addition, 2 g. of benzoylperoxide are added. During polymerization it is necessary to cool or heat the reaction mixture in order to keep the reaction temperature at 70° C. 4 hours after the start of dropwise addition polymerization is terminated by cooling to room temperature. Examination of the resulting copolymers showed the following results:

Solid substance content _____percent__ 89.6
K-value _____ 28.4
Viscosity (rotation viscosimeter) _____cp__ 173500

The copolymers was mixed with 1% of a 50% solution of zinc chloride in water, thoroughly mixed and applied in conventional manner in varying thickness of the feed (37, 90 and 92 g./m.$^2$) to foils of terephthalic acid-ethyleneglycol-polyester. Previously an anchoring layer was applied in form of a thin coat of a vinylidenechloride-acrylonitrile-mixed polymerizate. The foils provided with a coating were exposed for 15 minutes to heating to 80° C. or 5 minutes to 100° C. in order to bring about cross-linking of the layers applied.

The following results were obtained:

| Curing | 15 min./80° C. | | 5 min./100° C. |
|---|---|---|---|
| Weight of the adhesive layer applied (g./m.$^2$) | 90 | 92 | 37 |
| Adhesive power (p./cm.) | 426 | 282 | 260 |
| "Holding power" in minutes at— | | | |
| 50° C./800 g. weighting | 5.5 | 17 | >90 |
| 100° C./800 g. weighting | >90 | >90 | >90 |

EXAMPLE 4

A mixture of 6 g. butenol-3
34 g. isooctylacrylate (2-ethyl-hexylacrylate)
34 g. vinylacetate
0.74 g. α,α-azodiisobutyric-acid-nitrile is introduced into the reaction vessel and polymerized in the manner described in Examples 1 and 3. About 20 minutes after the start of the reaction the following mixture was added drop by drop:

60 g. isooctylacrylate (2-ethyl-hexylacrylate)
60 g. n-butylacrylate
2 g. acrylic acid
2 g. maleic acid anhydride 2 g. glycidylmethacrylate
1.26 g. α,α-azodiisobutyric-acid-nitrile at 60° C. The duration of polymerization amounted to 10 hours and the yield was 91%. The resulting copolymers had a K-value of 24.3. It was mixed with 2% triethanolamine and applied to a number of different heat-resistant flexible supports and subjected to cross-linking by heating for 5 minutes to 100° C. in a drying tunnel. Examination of the finished adhesive strips gave the following result:

Adhesive power on steel _____ p./cm__ 246
"Holding power":
    At 50° C./800 g. weighting _____ minutes__ 18
    At 100° C./800 g. weighting _____ do____ 2

EXAMPLE 5

In a manner analogous to the above Example 4 another copolymers was prepared in which merely the vinylacetate was substituted by an equal amount of vinylisobutylether. The resulting copolymers had a K-value of 26.9 (yield 87%). It was mixed with 0.5% zinc chloride, applied to the same supports as in Example 4 and likewise subjected to a heat treatment of 5 minutes at 100° C. for cross-linking. Examination of the adhesive strips prepared by application of this copolymers yielded the following result:

Adhesive power on steel _____ p./cm__ 270
"Holding power":
    At 50° C./800 g. weighting _____ minutes__ 19
    At 100° C./800 g. weighting _____ do____ 2

We claim:
1. A process for the production of self-adhesive tapes and foils having a pressure-sensitive adhesive layer based on acrylic acid ester copolymers, comprising the steps of: applying to a flexible support a liquid or viscous coating spreadable at room temperature and containing less than 11% by weight of the total composition of solvents if any; subsequently heating said coating on said support at temperatures from about 60° C. to about 150° C. whereby said coating is converted into a self-adhesive mass having good adhesive power and thermostability; said coating comprising a low-molecular weight copolymer having a K-value of from about 24 to tbout 37 obtained by using a chain stoppage regulator in the polymerization process selected from the group consisting of lauryl mercaptan (1-dodecanthiol) and dithio-bis-(thioformic acid)-o,o-diisopropylester (diproxide) and formed of: (a) from about 85 to about 99.95 parts by weight of at least one acrylic acid ester of a non-tertiary alkyl alcohol, the alcohol component of which is selected from the group consisting of alcohols containing of from 4 to 12 carbon atoms in a branched chain and alcohols containing of from 4 to 12 carbon atoms in an unbranched chain; (b) from about 0.05 to about 15 parts by weight of at least one monomeric compound polymerizable with said acrylic acid ester or esters and containing polymerizable double bonds and reactive groups in the molecule, said monomeric compound being selected from the group consisting of glycidylmethacrylate, glycidylacrylate, acrolein, maleic acid anhydride, acrylic acid, methacrylic acid, methylene glutaric acid, butenol-3 and mixtures of these monomeric compounds, and admixed with said low-molecular weight copolymer substances selected from the group consisting of catalysts and polyfunctional compounds, which are selected from the group consisting of polyisocyanates, reaction products of polyisocyanates, and alcanolamines, said catalysts being less than 2% by weight, based on the copolymer, and said polyfunctional compounds being less than 15% by weight, based on the copolymer.

2. The process as claimed in claim 1, in which up to 50% by weight of the acrylic acid alkyl ester component (a) is substituted by unsaturated monomers selected from the group consisting of vinyl esters, vinyl ethers, lower acrylic acid esters having 1 to 3 carbon atoms in the alkyl alcohol radical and methacrylic acid alkyl esters.

3. The process as claimed in claim 1, in which the catalysts are selected from the group consisting of p-toluene sulfonic acid and zinc chloride.

4. A self-adhesive tape having a pressure-sensitive adhesive layer based on acrylic acid ester copolymers having good adhesive power and thermostability, comprising a flexible support, said layer including a pressure-sensitive adhesive material in the form of a cured coating of a low-molecular weight copolymer having a K-value of from about 24 to about 37 and obtained by using a chain stoppage regulator in the polymerization process selected from the group consisting of lauryl mercaptane (1-dodecanthiol) and dithio-bis-(thioformic acid) - o,o-diisopropylester (diproxide) bonded to said support and being spreadable at room temperature in a substantially solvent free state and consisting essentially of: (a) from about 85 to 99.95 parts by weight of one to several acrylic acid esters of a non-tertiary alkyl alcohol, the alcohol component of which is selected from the group consisting of alcohols containing 4 to 12 carbon atoms in a branched chain and alcohols containing 4 to 12 carbon atoms in an unbranched chain; and (b) from about 0.05 to 15 parts by weight of one to several monomeric compounds being polymerizable with said acrylic acid esters and containing polymerizable double bonds and at least one reactive group in the molecule, said monomeric compounds being selected from the group consisting of glycidylmethacrylate, glycidylacrylate, acrolein, maleic acid anhydride, acrylic acid, methacrylic acid, methylene glutaric acid, butenol-3 and mixtures of these monomeric compounds.

5. A self-adhesive tape as claimed in claim 4, in which up to 50% by weight of the acrylic acid alkyl ester component (a) is substituted by unsaturated monomers selected from the group consisting of vinyl esters, vinyl ethers, lower acrylic acid esters having 1 to 3 carbon atoms in the alkyl alcohol radical and methacrylic acid alkyl esters.

References Cited
UNITED STATES PATENTS

| | | | |
|---|---|---|---|
| 3,222,419 | 12/1965 | Jubilee et al. | 117—122 X |
| 3,189,480 | 6/1965 | Franzen et al. | 117—122 |
| 3,361,702 | 1/1968 | Wartman et al. | 260—33.2 |
| 2,421,640 | 6/1947 | New et al. | 117—122 |

WILLIAM D. MARTIN, Primary Examiner

B. D. PIANALTO, Assistant Examiner

U.S. Cl. X.R.

117—161 UIC, 161 UIN, 161 UIT; 260—33.4 R